(12) United States Patent
Lu et al.

(10) Patent No.: US 12,442,930 B2
(45) Date of Patent: Oct. 14, 2025

(54) PROACTIVE MITIGATION OF GPS ACCURACY ERRORS

(71) Applicant: International Business Machines Corporation, Armonk, NY (US)

(72) Inventors: Fang Lu, Billerica, MA (US); Jeremy R. Fox, Georgetown, TX (US); Tushar Agrawal, West Fargo, ND (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 18/356,803

(22) Filed: Jul. 21, 2023

(65) Prior Publication Data

US 2025/0028054 A1 Jan. 23, 2025

(51) Int. Cl.
*G01S 19/07* (2010.01)
*G01S 19/10* (2010.01)

(52) U.S. Cl.
CPC ............ *G01S 19/073* (2019.08); *G01S 19/10* (2013.01)

(58) Field of Classification Search
CPC ........ G01S 19/073; G01S 19/10; G01S 19/48; G01S 19/396
USPC ..................................................... 455/456.1
See application file for complete search history.

(56) References Cited

U.S. PATENT DOCUMENTS

| | | | | |
|---|---|---|---|---|
| 5,640,323 A | * | 6/1997 | Kleimenhagen | G05D 1/0242 701/1 |
| 5,928,309 A | * | 7/1999 | Korver | G01S 19/47 701/472 |
| 9,261,599 B1 | * | 2/2016 | Golden | G01S 19/23 |
| 9,596,570 B1 | * | 3/2017 | Cardoso de Moura | H04L 67/52 |
| 10,599,154 B2 | * | 3/2020 | Dean | G05D 1/646 |
| 10,816,995 B2 | * | 10/2020 | Zhang | G05D 1/0212 |

(Continued)

FOREIGN PATENT DOCUMENTS

| | | | | |
|---|---|---|---|---|
| EP | 3614687 A1 | * | 2/2020 | ............. G01S 19/13 |
| EP | 3848674 B1 | * | 4/2024 | ........... G01C 21/362 |

(Continued)

OTHER PUBLICATIONS

"Cognitive Assistance Lab-NavCog", 2017, 03 pages, http://www.cs.cmu.edu/~NavCog/navcog.html.

(Continued)

*Primary Examiner* — Mahendra R Patel
(74) *Attorney, Agent, or Firm* — Yee & Associates, P.C.

(57) ABSTRACT

Mitigating GPS inaccuracy is provided. The method comprises identifying a required level of location accuracy for an activity of an autonomous system and determining, according to GPS coordinates, a location of the autonomous system. A determination is made, according to a knowledge base created by historical learning, whether GPS location accuracy at the location of meets the required level of location accuracy for the activity. Responsive to a determination that the GPS location accuracy at the location of the autonomous system does not meet the required level of accuracy, location determination is handed off to an installed infrastructure within proximity of the autonomous system which provides the required level of location accuracy. The autonomous system then performs the activity according to location information provided by the installed infrastructure.

20 Claims, 4 Drawing Sheets

(56) References Cited

U.S. PATENT DOCUMENTS

| | | | |
|---|---|---|---|
| 10,871,576 | B2 | 12/2020 | Nirula et al. |
| 10,969,226 | B1* | 4/2021 | Jankowski .......... G01C 21/1654 |
| 11,102,609 | B2* | 8/2021 | Ornelas ................ H04W 4/021 |
| 11,119,223 | B2* | 9/2021 | Dill ........................ G01S 19/22 |
| 11,553,308 | B2 | 1/2023 | Calagaz |
| 11,746,501 | B1* | 9/2023 | Gajić ...................... G06V 20/64 701/27 |
| 12,117,532 | B1* | 10/2024 | Blanton, Jr. ........... G01S 19/071 |
| 2014/0077991 | A1 | 3/2014 | Bar-Sever et al. |
| 2014/0258201 | A1 | 9/2014 | Finlow-Bates |
| 2017/0164315 | A1* | 6/2017 | Smith .................... G01S 5/0284 |
| 2019/0250283 | A1 | 8/2019 | Larnaout et al. |
| 2020/0209406 | A1 | 7/2020 | Lin et al. |
| 2020/0242282 | A1* | 7/2020 | Santarone ............. G06F 3/0346 |
| 2021/0156949 | A1* | 5/2021 | Liou ................... G01S 5/02213 |
| 2021/0333411 | A1* | 10/2021 | Gum ........................ G01S 19/21 |
| 2022/0091274 | A1* | 3/2022 | Kim ......................... G01S 19/40 |
| 2023/0152471 | A1* | 5/2023 | Nekoui ................ G01S 19/396 342/357.64 |
| 2025/0083690 | A1* | 3/2025 | Samples ............. B60W 60/001 |

FOREIGN PATENT DOCUMENTS

| | | | | |
|---|---|---|---|---|
| KR | 20070088455 | A | * 8/2007 | ........... G01S 5/0242 |
| KR | 20070118678 | A | * 12/2007 | ............. G01S 5/021 |
| WO | WO-2019168530 | A1 | * 9/2019 | ............ B60W 40/04 |
| WO | WO-2021221481 | A1 | * 11/2021 | ............. G01S 17/04 |
| WO | WO-2022261381 | A1 | * 12/2022 | ............... G06T 7/74 |
| WO | WO-2023028274 | A1 | * 3/2023 | ........ B60W 50/0205 |
| WO | WO-2023034500 | A1 | * 3/2023 | ............ G01S 5/0278 |
| WO | WO-2023107482 | A1 | * 6/2023 | ........... G06Q 30/018 |
| WO | WO-2024042508 | A1 | * 2/2024 | ............. G06F 16/29 |
| WO | WO-2024043994 | A1 | * 2/2024 | ......... G06F 3/04815 |

OTHER PUBLICATIONS

Blog "Do Weather Conditions Affect GPS Accuracy?", FROTCOM—News & Events, Nov. 25, 2016, 06 pages, https://www.frotcom.com/blog/2016/11/do-weather-conditions-affect-gps-accuracy.

GPS Spotlight "GPS & Geosciences", How GPS Works, UNAVCO, Dec. 26, 2019, 05 pages, https://spotlight.unavco.org/how-gps-works/gps-basics/gps-and-geosciences.html.

GPS.gov, "GPS Accuracy", Official U.S. government information about the Global Positioning System (GPS) and related topics, Mar. 3, 2022, 03 pages, https://www.gps.gov/systems/gps/performance/accuracy/.

IBM "Accessibility is a team effort", Aug. 18, 2025, 02 pages, https://www.ibm.com/able/mobile-navigation.html.

IBM "What is mobile technology?", Aug. 18, 2025, 04 pages, https://www.ibm.com/think/topics/mobile-technology.

Rathore Chinmaya S. "Planning a GPS Survey Part 2—Dilution of Precision Errors", Graticule—Where Geoinformatics meets Environmental Conservation, Feb. 16, 2017, 04 pages.

Callejo et al., "A Deep Dive Into The Accuracy Of IP Geolocation Databases And Its Impact On Online Advertising,", IEEE Transactions on Mobile Computing, vol. 22, Issue 8, Aug. 1, 2023, 15 pages. https://ieeexplore.ieee.org/document/9756248.

Garzon et al., "Geofence Index: A Performance Estimator for the Reliability of Proactive Location-Based Services," IEEE International Conference on Mobile Data Management, May 2017, 11 pages. https://www.researchgate.net/publication/317240325_Geofence_Index_A_Performance_Estimator_for_the_Reliability_of_Proactive_Location-Based_Services.

Grayson et al., "Accuracy Of WAAS-Enabled GPS—RF Warning Signals When Crossing A Terrestrial Geofence," Sensors, vol. 16, Jun. 2016, 8 pages. https://www.mdpi.com/1424-8220/16/6/912# :~:text=Devices%20equipped%20and%20used%20in,in%20which%20it%20is%20used.

Kunisada et al., "High Precision Location Estimation in Mountainous Areas Using GPS," Sensors, vol. 22, Feb. 2022, 11 pages. https://www.mdpi.com/1424-8220/22/3/1149.

Ozdemir et al., "Geofencing on the Real-Time GPS Tracking System and Improving GPS Accuracy with Moving Average, Kalman Filter and Logistic Regression Analysis," 3rd International Symposium on Multidisciplinary Studies and Innovative Technologies (ISMSIT), Oct. 2019, 7 pages. (See Citation No. 6. for URL). Ozdemir et al., Oct. 2019, 7 pages. URL for Citation 5: https://www.researchgate.net/publication/337985439_Geofencing_on_the_Real-Time_GPS_Tracking_System_and_Improving_GPS_Accuracy_with_Moving_Average_Kalman_Filter_and_Logistic_Regression_Analysis.

* cited by examiner

PROACTIVE MITIGATION OF GPS ACCURACY ERRORS

BACKGROUND

The present disclosure relates generally to navigation of autonomous systems, and more specifically to correcting for inaccuracy in global positioning system (GPS) information.

Precision of GPS signal is important for precision movement of autonomous systems. In such applications, the autonomous system identifies its current location and destination location from GPS signals and accordingly performs maneuvering and navigation. Any error in the GPS signal will compromise the ability of the autonomous system to perform precise maneuvering.

Examples of causes that can affect GPS accuracy include satellite signal blockage from buildings, bridges, trees, etc., indoor or underground use, signals reflected off buildings ("multipath"), radio interference, solar storms, temporary satellite maintenance or maneuvers that create gaps in coverage, as well as devices that do not comply with GPS interface specifications.

SUMMARY

An illustrative embodiment provides a method for mitigating global positioning system (GPS) inaccuracy. The method comprises identifying a required level of location accuracy for an activity of an autonomous system and determining, according to GPS coordinates, a location of the autonomous system. A determination is made, according to a knowledge base created by continuous historical machine learning, whether GPS location accuracy at the location of the autonomous system meets the required level of location accuracy for the activity of the autonomous system. Responsive to a determination that the GPS location accuracy at the location of the autonomous systems does not meet the required level of location accuracy for the activity of the autonomous system, location determination function is handed off to an installed infrastructure within a defined proximity of the autonomous system. The installed infrastructure is configured to provide the required level of location accuracy for the activity of the autonomous system. The autonomous system is then instructed to perform the activity according to location information provided by the installed infrastructure. According to other illustrative embodiments, a computer system, and a computer program product for mitigating GPS inaccuracy are provided.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
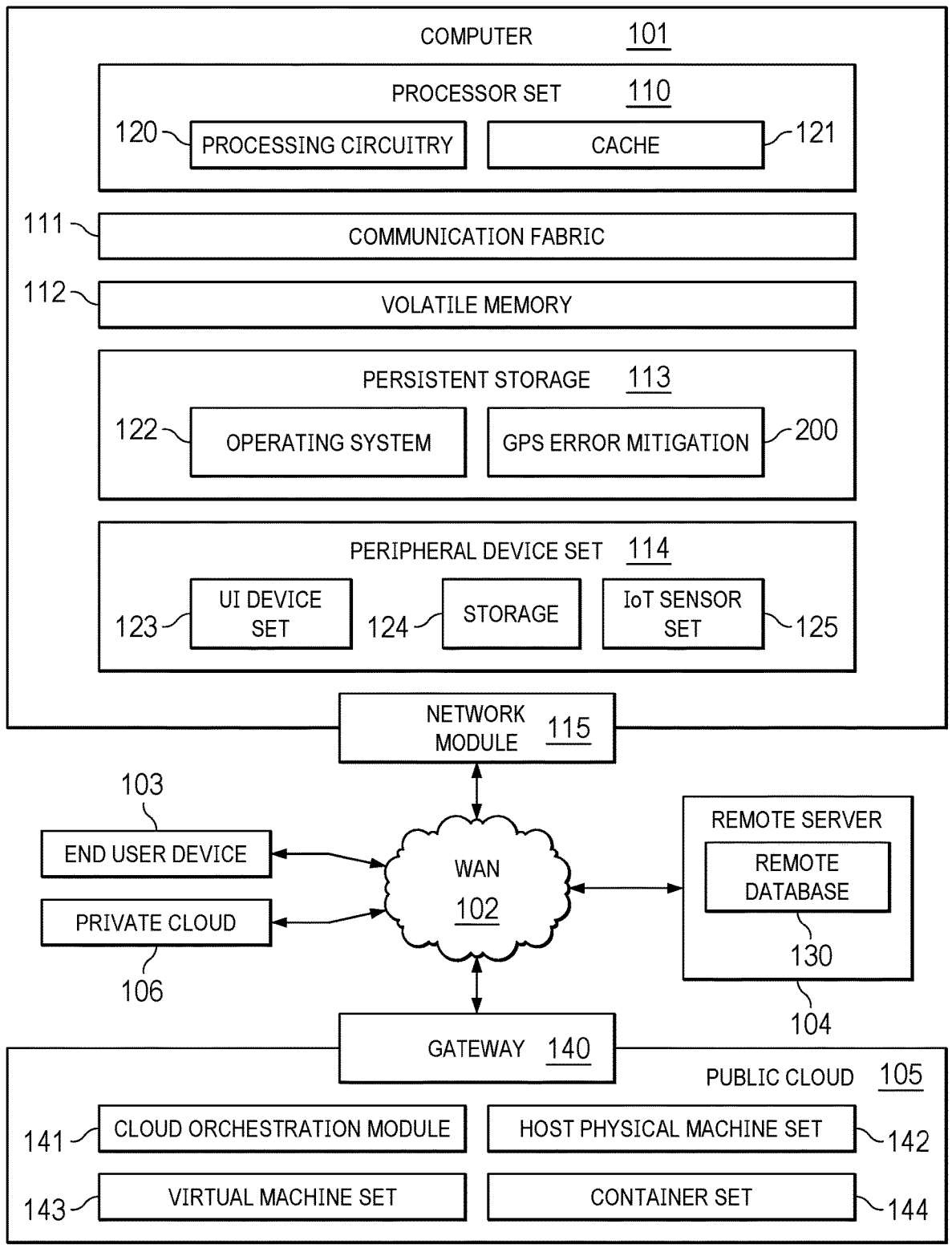
FIG. 1 depicts a pictorial representation of a computing environment in which illustrative embodiments may be implemented.

An illustrative embodiment provides a method for mitigating global positioning system (GPS) inaccuracy. The method comprises identifying a required level of location accuracy for an activity of an autonomous system and determining, according to GPS coordinates, a location of the autonomous system. A determination is made, according to a knowledge base created by continuous historical machine learning, whether GPS location accuracy at the location of the autonomous systems meets the required level of location accuracy for the activity of the autonomous system. Responsive to a determination that the GPS location accuracy at the location of the autonomous system does not meet the required level of location accuracy for the activity of the autonomous system, location determination function is handed off to an installed infrastructure within a defined proximity of the autonomous system. The installed infrastructure is configured to provide the required level of location accuracy for the activity of the autonomous system. The autonomous system is then instructed to perform the activity according to location information provided by the installed infrastructure. As a result, the illustrative embodiments provide the technical effect of increasing the accuracy of autonomous system movement and navigation in areas of reduced GPS accuracy.

The knowledge base includes factors that interfere with GPS location accuracy. The factors include at least one of geographical features, locations and shapes of architectural structures, or weather conditions. As a result, the illustrative embodiments provide a technical effect of using known GPS interference factors to identify areas of reduced GPS accuracy.

The installed infrastructure comprises at least one of cameras, motion sensors, light sensors, lidar, internet of things (IoT) sensors, or landmarks. As a result, the illustrative embodiments provide a technical effect of utilizing alternative position determining technologies to provide location information to the autonomous system in areas of reduced GPS accuracy.

The installed infrastructure can be contained within a geofenced area. As a result, the illustrative embodiments provide a technical effect of defining boundaries of areas in which alternative location determination technologies can take over from GPS.

As part of handing off location determination function to the installed infrastructure within a defined proximity of the autonomous system the handoff occurs when the autonomous system enters the geofenced area, and wherein the location determination function is handed off from the installed infrastructure to GPS when the autonomous system leaves the geofenced area. As a result, the illustrative embodiments provide a technical effect of utilizing a geofencing boundary to trigger handoffs between GPS and the installed infrastructure.

The activity of the autonomous system might require collaboration comprising at least one of autonomous system-to-autonomous system, autonomous system-to-non-autonomous system, or autonomous system-to-human. As a result, the illustrative embodiments provide a technical effect of taking into account effects of collaboration on required location determination accuracy.

A system comprises a storage device that stores program instructions and one or more processors operably connected to the storage device and configured to execute the program instructions to cause the system to identify a required level of location accuracy for an activity of an autonomous system; determine, according to GPS coordinates, a location of the autonomous system; determine, according to a knowledge base created by continuous historical machine learning, whether GPS location accuracy at the location of the autonomous systems meets the required level of location accuracy for the activity of the autonomous system; responsive to a determination that the GPS location accuracy at the location of the autonomous system does not meet the required level of location accuracy for the activity of the autonomous system, hand off location determination function to an installed infrastructure within a defined proximity of the autonomous system, wherein the installed infrastructure is configured to provide the required level of location accuracy for the activity of the autonomous system; and instruct the autonomous system to perform the activity according to location information provided by the installed infrastructure. As a result, the illustrative embodiments provide the technical effect of increasing the accuracy of autonomous system movement and navigation in areas of reduced GPS accuracy.

The knowledge base includes factors that interfere with GPS location accuracy. The factors include at least one of geographical features, locations and shapes of architectural structures, or weather conditions. As a result, the illustrative embodiments provide a technical effect of using known GPS interference factors to identify areas of reduced GPS accuracy.

The installed infrastructure comprises at least one of cameras, motion sensors, light sensors, lidar, internet of things (IoT) sensors, or landmarks. As a result, the illustrative embodiments provide a technical effect of utilizing alternative position determining technologies to provide location information to the autonomous system in areas of reduced GPS accuracy.

The installed infrastructure can be contained within a geofenced area. As part of handing off location determination function to the installed infrastructure within a defined proximity of the autonomous system the handoff occurs when the autonomous system enters the geofenced area, and wherein the location determination function is handed off from the installed infrastructure to GPS when the autonomous system leaves the geofenced area. As a result, the illustrative embodiments provide a technical effect of defining boundaries of areas in which alternative location determination technologies can take over from GPS utilizing the geofencing boundary to trigger handoffs between GPS and the installed infrastructure.

The activity of the autonomous system might require collaboration comprising at least one of autonomous system-to-autonomous system, autonomous system-to-non-autonomous system, or autonomous system-to-human. As a result, the illustrative embodiments provide a technical effect of taking into account effects of collaboration on required location determination accuracy.

A computer program product for mitigating global positioning system (GPS) inaccuracy. A persistent storage medium having program instructions configured to cause one or more processors to identify a required level of location accuracy for an activity of an autonomous system; determine, according to GPS coordinates, a location of the autonomous system; determine, according to a knowledge base created by continuous historical machine learning, whether GPS location accuracy at the location of the autonomous systems meets the required level of location accuracy for the activity of the autonomous system; responsive to a determination that the GPS location accuracy at the location of the autonomous system does not meet the required level of location accuracy for the activity of the autonomous system, hand off location determination function to an installed infrastructure within a defined proximity of the autonomous system, wherein the installed infrastructure is configured to provide the required level of location accuracy for the activity of the autonomous system; and instruct the autonomous system to perform the activity according to location information provided by the installed infrastructure. As a result, the illustrative embodiments provide the technical effect of increasing the accuracy of autonomous system movement and navigation in areas of reduced GPS accuracy.

The knowledge base includes factors that interfere with GPS location accuracy. The factors include at least one of geographical features, locations and shapes of architectural structures, or weather conditions. As a result, the illustrative embodiments provide a technical effect of using known GPS interference factors to identify areas of reduced GPS accuracy.

The installed infrastructure comprises at least one of cameras, motion sensors, light sensors, lidar, internet of things (IoT) sensors, or landmarks. As a result, the illustrative embodiments provide a technical effect of utilizing alternative position determining technologies to provide location information to the autonomous system in areas of reduced GPS accuracy.

The installed infrastructure can be contained within a geofenced area. As a result, the illustrative embodiments provide a technical effect of defining boundaries of areas in which alternative location determination technologies can take over from GPS.

As part of handing off location determination function to the installed infrastructure within a defined proximity of the autonomous system the handoff occurs when the autonomous system enters the geofenced area, and wherein the location determination function is handed off from the installed infrastructure to GPS when the autonomous system leaves the geofenced area. As a result, the illustrative embodiments provide a technical effect of utilizing a geofencing boundary to trigger handoffs between GPS and the installed infrastructure.

The activity of the autonomous system might require collaboration comprising at least one of autonomous system-to-autonomous system, autonomous system-to-non-autonomous system, or autonomous system-to-human. As a result, the illustrative embodiments provide a technical effect of taking into account effects of collaboration on required location determination accuracy.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference now to the figures, and in particular, with reference to FIG. 1, a diagram of a data processing environment is provided in which illustrative embodiments may be implemented. It should be appreciated that FIG. 1 is only meant as an example and are not intended to assert or imply any limitation with regard to the environments in which different embodiments may be implemented. Many modifications to the depicted environment may be made.

FIG. 1 depicts a pictorial representation of a computing environment in which illustrative embodiments may be implemented. Computing environment 100 contains an example of an environment for the execution of at least some of the computer code involved in performing the inventive methods, such as GPS error mitigation 200. In addition to GPS error mitigation 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and GPS error mitigation 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer, or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in GPS error mitigation 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid state storage devices. Operating system 122 may take several forms, such as various known proprietary operating systems or open source Portable Operating System Interface-type operating systems that employ a kernel. GPS error mitigation instructions included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth® connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The illustrative embodiments recognize and take into account that, in different contextual situations, GPS signals can have some level of error that makes it difficult for autonomous system to travel precisely. At the same time, an autonomous system might not have to maintain the same degree of precision movement for its entire operation. The level of movement precision and location accuracy might be specific to location and activity type. Contextual situations can create errors in GPS signals during times when the autonomous system requires precision movement.

The illustrative embodiments provide installed infrastructure such as cameras and sensors at landmarks to mitigate GPS signal error and enable a required level of precision for the navigation of autonomous systems. The illustrative embodiments factor in the constraints on the type of infrastructure component that can be installed in each surrounding to augment the GPS signals. Geofencing boundaries can be used in conjunction with the installed infrastructure to define areas in which GPS signals can be augmented by or replace by the infrastructure to provide the level of location accuracy required of an autonomous system maneuvering within the geofenced area.

A knowledge base built from historical knowledge of contextual scenarios regarding local obstacles, weather conditions, and similar factors that can impact GPS accuracy can be used to determine the correct elements to include and add to the installed infrastructure as well as the types of activities requiring higher levels of location accuracy in a given area.

Figure 2:
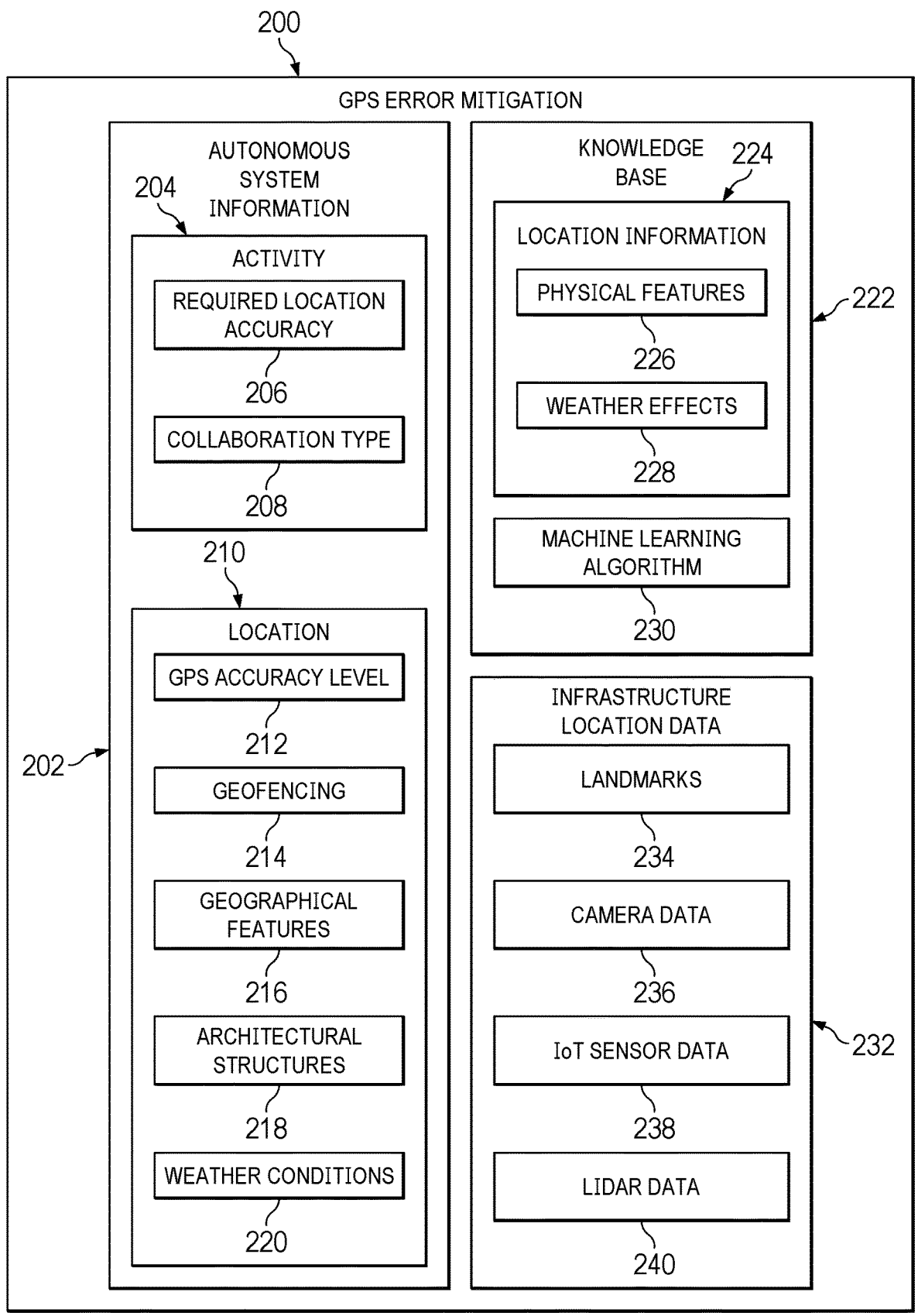
FIG. 2 depicts a block diagram for GPS error mitigation in accordance with an illustrative embodiment.

FIG. 2 depicts a block diagram for GPS error mitigation in accordance with an illustrative embodiment. GPS error mitigation 200 can be implemented in computing environment 100 in FIG. 1.

GPS error mitigation 200 comprises information about an autonomous system 202. The autonomous system might be any free moving system that requires navigation information such as, for example, an automobile or unmanned aerial vehicle (UAV). Autonomous system information 202 includes an activity 204 of the autonomous system. The activity 204 might be a specific purpose-built function of autonomous system in question or might be one of a number of activities possible for the autonomous system. GPS error mitigation 200 can identify a collaboration type 208 required to perform activity 204 and any constraints imposed on the activity 204 of the autonomous system (e.g., cameras are not allowed within a specific area). GPS error mitigation 200 can historically identify different activity types and collaboration types 208 based on knowledge base 222 and determine a corresponding required location accuracy 206 that is specific to that activity and collaboration. GPS error mitigation 200 can classify the activity 204 and surroundings based on activity type and collaboration type.

For example, an ambulance responding to an emergency call requires a greater level of location accuracy for efficient and time saving navigation (e.g., in a busy city), versus a user commuting to work in the suburbs. Collaboration type 208 which can affect the required location accuracy 206 for the autonomous system. Collaboration type 208 might include collaboration between autonomous systems, collaboration between an autonomous system and a non-autonomous system, or collaboration between an autonomous system and a human.

Autonomous system information 202 also includes information about the current location 210 of the autonomous system according to GPS. This location 210 has an associated GPS accuracy level 212, which may be known and stored in knowledge base 222. GPS error mitigation 200 determines whether this GPS accuracy level 212 meets the required location accuracy 206 of the particular activity 204 in question. The GPS accuracy level 212 associated with location 210 can be affected by several factors present at the location. These factors include geographical features 216 such as hills, trees, architectural structures 218 such as buildings and bridges, and current weather conditions 220, all of which can interfere with clear GPS signals. Although some atmospheric conditions like rain or snow can weaken the GPS signal, they generally do not affect GPS reception, they can affect the positioning of the antenna. In cases where a GPS tracking antenna has a thick ice or snow coating, the accuracy level can drop. It is also possible that when battery operated GPS devices are cold, due to weather conditions, they will emit less power resulting in signal degradation.

Figure 3:
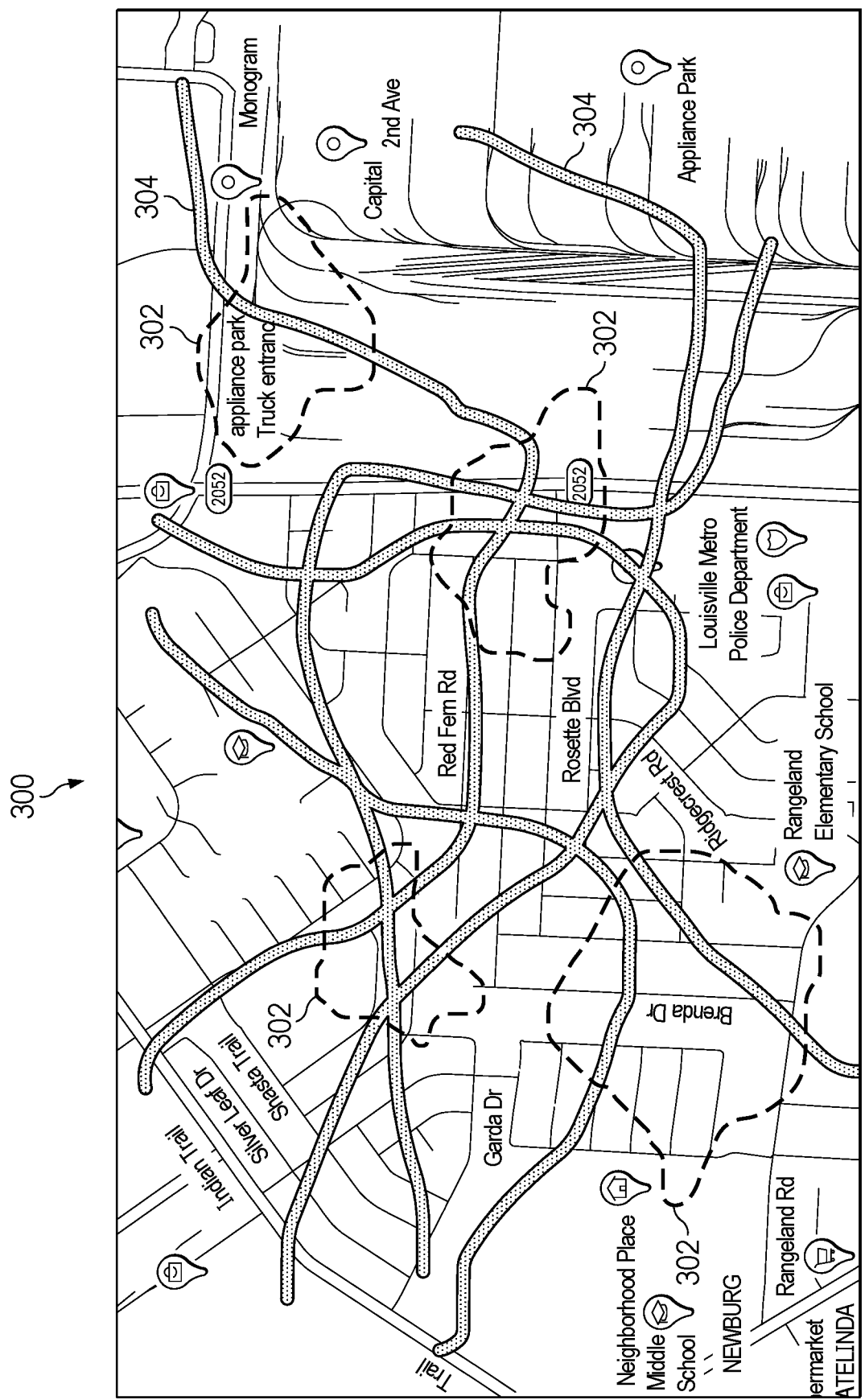
FIG. 3 depicts a diagram illustrating geofencing for high-precision areas in accordance with an illustrative embodiment.

Location 210 might be contained within geofencing 214 which is established around an area known to require a high degree of location precision (see FIG. 3). Using historical knowledge in knowledge base 222, GPS error mitigation 200 can identify in which areas precision mobility is required by an autonomous system and which areas have more lenient tolerance of precision. GPS error mitigation 200 can also identify areas where GPS signal-based mobility is sufficiently accurate for precision mobility and areas where GPS signal-based mobility is not sufficient. By matching areas known to require precision mobility with known areas of less accurate GPS tracking, GPS error mitigation 200 can determine where special infrastructure should be installed to provide the missing level of location accuracy. Therefore, GPS error mitigation 200 can validate GPS accuracy in a given area and whether GPS can provide the required location accuracy 206.

Areas known to require high location precision as well as known interference factors affecting GPS accuracy might have installed infrastructure that provide supplementary or alternative location determination functions with a greater accuracy than GPS in those areas. The installed infrastructure might comprise devices and features specifically placed to take account of known interference factors in the area. Infrastructure location data 232 provided by the installed infrastructure can mitigate the reduced GPS accuracy in such areas. Infrastructure location data 232 might comprise landmarks 234 determined according to known reference points in the area, camera data 236, IoT sensor data 238, and lidar data 240. GPS error mitigation 200 can identify different reference points, and from these reference points create landmarks 234. Landmarks 234 can be selected based on historical GPS signals or distances from other reference points in the area.

Knowledge base 222 provides location information 224 for determining which areas have inadequate GPS accuracy as well as the optimal positions for installing the infrastructure to supplement or replace GPS navigation in the chosen area. Knowledge base 222 may include knowledge about physical features 226 in an area (e.g., buildings) that are known to interfere with GPS signaling. Knowledge based 222 might also include knowledge about weather effects 228 in the area on GPS accuracy, including weather cycles and the specific effects of different types of weather patterns in the area.

Knowledge base 222 can be created and continually updated by a machine learning algorithm 230 that uses historical data but also takes into account changing conditions. Machine learning algorithm 230 can monitor the information shared from public websites or social media to analyze whether will be any new construction or major infrastructure changes in the area. From this new information machine learning algorithm 230 can determine whether the new infrastructure change will potentially impact GPS accuracy. The system can alert the operator of the GPS system to take preventive actions.

FIG. 3 depicts a diagram illustrating geofencing for high-precision areas in accordance with an illustrative embodiment. FIG. 3 is an example of geofencing 214 in FIG. 2.

The autonomous system operates in environment 300 according to a type of activity and collaboration. GPS error mitigation 200 identifies the level of location accuracy required in different places. Lines 304 indicated different travel paths of the autonomous system.

Geofenced areas 302 define regions where a high degree of location precision is required that cannot be provided by GPS in those areas. Though GPS is able to provide location determination service to autonomous systems within the geofenced areas 302 it might not be able do so with required level of accuracy according to the requirements of the activity in question (e.g., within 25 m, when an accuracy of within 2 m is required). Appropriate infrastructure is installed within the geofenced areas 302 to provide the required level of location accuracy while autonomous systems are present in these places. The GPS error mitigation system can use historical learning to determine how much accuracy is required for particular activities and collaboration types and the boundary range where the installed infrastructure can provide the required level of location accuracy. These determinations are used to create a geofencing boundary. GPS satellites broadcast their signals in space with a base minimum level of accuracy. However, the position data that GPS receivers receive depends on additional factors including satellite geometry, signal blockage, atmospheric conditions, and receiver design, features, and quality. The infrastructure sensors have a closer view of the autonomous system than the GPS satellites with less intervening elements. Thus, the infrastructure can provide position and movement information about the autonomous system relative to established local reference points, enabling a higher level of location accuracy with less confounding factors. The infrastructure sensors within the geofencing boundary can also detect the presence or absence of an object, which GPS might miss. Examples of types of position sensors that might be used in the infrastructure include potentiometric (resistance-based), inductive, eddy current-based, capacitive, magnetostrictive, Hall effect-based, fiber optic, optical, and ultrasonic. In addition, the infrastructure might include indoor positioning systems which use radio waves and have an advantage over other types of sensors because of the technology on mobile devices capable of processing radio waves in the surrounding area.

When an autonomous system enters a geofenced area 302, the installed infrastructure takes control from GPS to provide the location determination to the autonomous system at a high level of accuracy required for particular activities and collaborations within the geofenced area. When the autonomous system leaves the geofenced area 302, GPS takes over again to provide location information.

Figure 4:
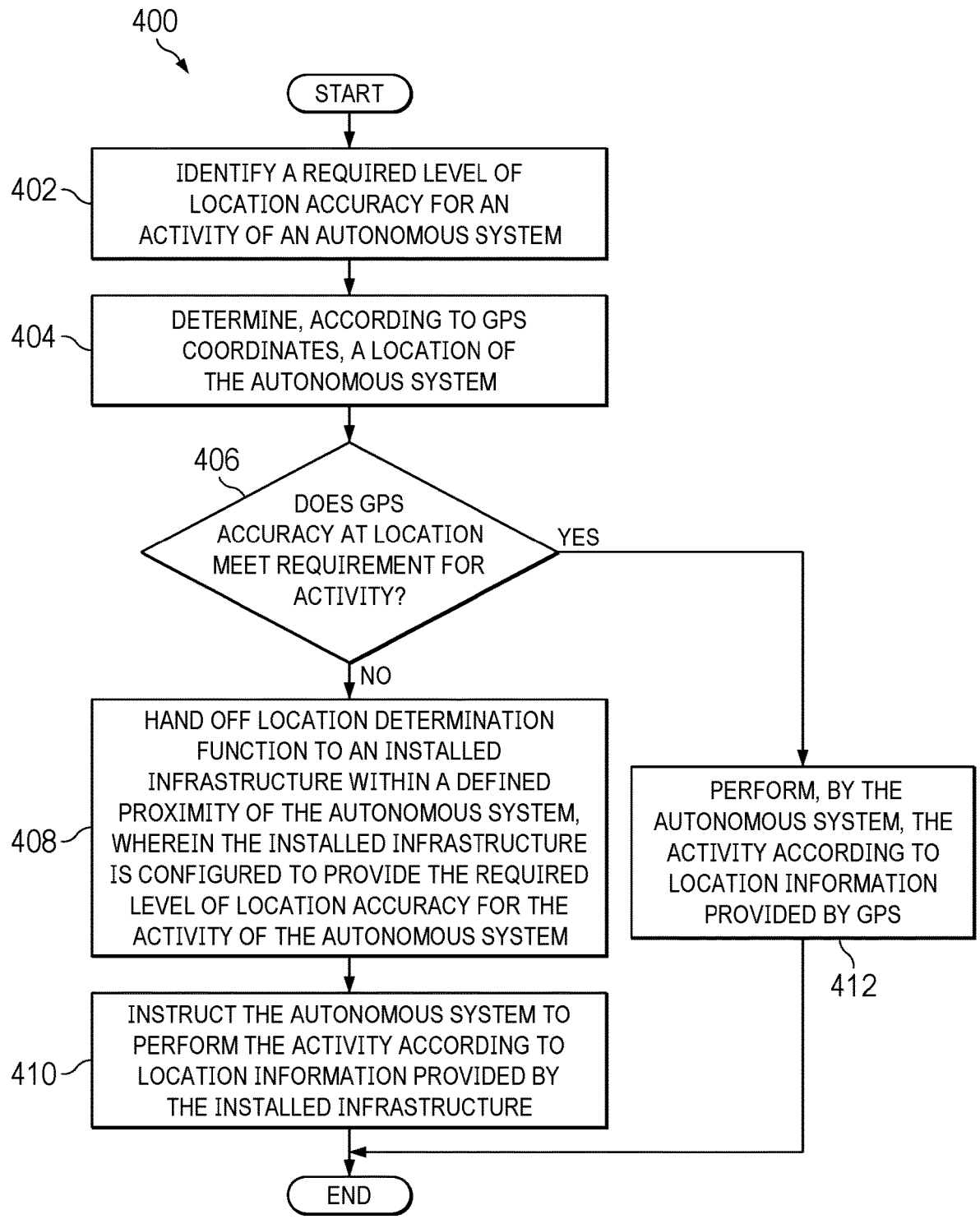
FIG. 4 depicts a flowchart for mitigating GPS inaccuracy in accordance with an illustrative embodiment.

FIG. 4 depicts a flowchart for mitigating global positioning system (GPS) inaccuracy in accordance with an illustrative embodiment. Process 400 can be carried out in computing environment 100 in FIG. 1.

Process 400 begins by identifying a required level of location accuracy for an activity of an autonomous system (step 402). The required level of location accuracy can be determined both by means of input data from the infrastructure as well as profiles for the autonomous system/user in question. The autonomous system or user of the system might have a profile that can be accessed by the PGS error mitigation system. For example, activities associated with an ambulance or police aerial drone generally require a higher level of location accuracy than a personal use automobile. Required location accuracy might also vary according to a known destination with an associated urgency. For example, a commute to the office or drive to a store requires a lower level of location accuracy than an emergency trip to a hospital. In addition, the urgency of a trip requiring greater location accuracy can also be extrapolated according to information provided by a user such as calendar appointments or speech, facial, and body language recognition provided by the user's mobile device or sensors located in the user's vehicle (autonomous system) with the user's consent.

The activity of the autonomous system might require collaboration comprising at least one of autonomous system-to-autonomous system, autonomous system-to-non-autonomous system, or autonomous system-to-human, each requiring a respective level of location accuracy.

Process 400 determines, according to GPS coordinates, a location of the autonomous system (step 404).

Process 400 determines, according to a knowledge base created by continuous historical machine learning, whether GPS location accuracy at the location of the autonomous systems meets the required level of location accuracy for the activity of the autonomous system (step 406). The knowledge base includes factors that interfere with GPS location accuracy, including, for example, geographical features, locations and shapes of architectural structures, and weather conditions.

Responsive to a determination that the GPS location accuracy at the location of the autonomous systems does not meet the required level of location accuracy for the activity of the autonomous system, process 400 hands off location determination function to an installed infrastructure within a defined proximity of the autonomous system (step 408). The installed infrastructure is configured to provide the required level of location accuracy for the activity of the autonomous system. The installed infrastructure might comprise at least one of, e.g., cameras, position sensors, motion sensors, light sensors, lidar, internet of things (IoT) sensors, and or landmarks.

The installed infrastructure might be contained within a geofenced area. In the case of geofencing, the location determination function is handed off from GPS to the installed infrastructure when the autonomous system enters the geofenced area. When the autonomous system leaves the geofenced area the location determination function is then handed back from the installed infrastructure to GPS.

The autonomous system is then instructed to perform the activity according to location information provided by the installed infrastructure (step 410).

Responsive to a determination that the GPS location accuracy at the location of the autonomous systems does meet the required level of location accuracy for the activity of the autonomous system, the autonomous system performs the activity according to location information provided by GPS (step 412).

Process 400 then ends.

As used herein, a "number of," when used with reference to objects, means one or more objects. For example, a "number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As used herein, a "computer instruction," or "computer program", means one step or a set of steps that includes information on how to operate, perform, or maintain particular computer software or hardware. For example, a "computer instruction" can be a computer program instruction in the form of lines of code or source code that are executable by a computer system.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present disclosure have been presented for purposes of illustration but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method of mitigating global positioning system (GPS) inaccuracy, the method comprising:

identifying a required level of location accuracy for an activity of an autonomous system;

determining, according to GPS coordinates, a location of the autonomous system;

determining, according to a knowledge base created by continuous historical machine learning, whether GPS location accuracy at the location of the autonomous systems meets the required level of location accuracy for the activity of the autonomous system;

responsive to a determination that the GPS location accuracy at the location of the autonomous system does not meet the required level of location accuracy for the activity of the autonomous system, handing off location determination function to an installed infrastructure within a defined proximity of the autonomous system, wherein the installed infrastructure is configured to provide the required level of location accuracy for the activity of the autonomous system; and instructing the autonomous system to perform the activity according to location information provided by the installed infrastructure.

2. The method of claim 1, wherein the knowledge base includes factors that interfere with GPS location accuracy.

3. The method of claim 2, wherein the factors include at least one of:

geographical features;

locations and shapes of architectural structures; or weather conditions.

4. The method of claim 1, wherein the installed infrastructure comprises at least one of:

cameras;

position sensors;

motion sensors;

light sensors;

lidar;

internet of things (IoT) sensors; or landmarks.

5. The method of claim 1, wherein the installed infrastructure is contained within a geofenced area.

6. The method of claim 5, wherein the location determination function is handed off from GPS to the installed infrastructure when the autonomous system enters the geofenced area, and wherein the location determination function is handed off from the installed infrastructure to GPS when the autonomous system leaves the geofenced area.

7. The method of claim 1, wherein the activity of the autonomous system requires collaboration comprising at least one of:
- autonomous system-to-autonomous system;
- autonomous system-to-non-autonomous system; or
- autonomous system-to-human.

8. A system for mitigating global positioning system (GPS) inaccuracy, the system comprising:
- a storage device that stores program instructions;
- one or more processors operably connected to the storage device and configured to execute the program instructions to cause the system to:
  - identify a required level of location accuracy for an activity of an autonomous system;
  - determine, according to GPS coordinates, a location of the autonomous system;
  - determine, according to a knowledge base created by continuous historical machine learning, whether GPS location accuracy at the location of the autonomous systems meets the required level of location accuracy for the activity of the autonomous system;
  - responsive to a determination that the GPS location accuracy at the location of the autonomous system does not meet the required level of location accuracy for the activity of the autonomous system, hand off location determination function to an installed infrastructure within a defined proximity of the autonomous system, wherein the installed infrastructure is configured to provide the required level of location accuracy for the activity of the autonomous system; and
  - instruct the autonomous system to perform the activity according to location information provided by the installed infrastructure.

9. The system of claim 8, wherein the knowledge base includes factors that interfere with GPS location accuracy.

10. The system of claim 9, wherein the factors include at least one of:
- geographical features;
- locations and shapes of architectural structures; or
- weather conditions.

11. The system of claim 8, wherein the installed infrastructure comprises at least one of:
- cameras;
- position sensors;
- motion sensors;
- light sensors;
- lidar;
- internet of things (IoT) sensors; or
- landmarks.

12. The system of claim 8, wherein the installed infrastructure is contained within a geofenced area, wherein the location determination function is handed off from GPS to the installed infrastructure when the autonomous system enters the geofenced area, and wherein the location determination function is handed off from the installed infrastructure to GPS when the autonomous system leaves the geofenced area.

13. The system of claim 8, wherein the activity of the autonomous system requires collaboration comprising at least one of:
- autonomous system-to-autonomous system;
- autonomous system-to-non-autonomous system; or
- autonomous system-to-human.

14. A computer program product for mitigating global positioning system (GPS) inaccuracy, the computer program product comprising:
- a persistent storage medium comprising a non-transitory computer readable medium having program instructions configured to cause one or more processors to:
  - identify a required level of location accuracy for an activity of an autonomous system;
  - determine, according to GPS coordinates, a location of the autonomous system;
  - determine, according to a knowledge base created by continuous historical machine learning, whether GPS location accuracy at the location of the autonomous systems meets the required level of location accuracy for the activity of the autonomous system;
  - responsive to a determination that the GPS location accuracy at the location of the autonomous system does not meet the required level of location accuracy for the activity of the autonomous system, hand off location determination function to an installed infrastructure within a defined proximity of the autonomous system, wherein the installed infrastructure is configured to provide the required level of location accuracy for the activity of the autonomous system; and
  - instruct the autonomous system to perform the activity according to location information provided by the installed infrastructure.

15. The computer program product of claim 14, wherein the knowledge base includes factors that interfere with GPS location accuracy.

16. The computer program product of claim 15, wherein the factors include at least one of:
- geographical features;
- locations and shapes of architectural structures; or
- weather conditions.

17. The computer program product of claim 14, wherein the installed infrastructure comprises at least one of:
- cameras;
- position sensors;
- motion sensors;
- light sensors;
- lidar;
- internet of things (IoT) sensors; or
- landmarks.

18. The computer program product of claim 14, wherein the installed infrastructure is contained within a geofenced area.

19. The computer program product of claim 18, wherein the location determination function is handed off from GPS to the installed infrastructure when the autonomous system enters the geofenced area, and wherein the location determination function is handed off from the installed infrastructure to GPS when the autonomous system leaves the geofenced area.

20. The computer program product of claim 14, wherein the activity of the autonomous system requires collaboration comprising at least one of:
- autonomous system-to-autonomous system;
- autonomous system-to-non-autonomous system; or
- autonomous system-to-human.

* * * * *